(12) United States Patent
Ikegami (10) Patent No.: US 7,461,069 B2
(45) Date of Patent: Dec. 2, 2008

(54) LOG INFORMATION MANAGEMENT DEVICE, LOG INFORMATION GENERATION DEVICE, AND COMPUTER-READABLE MEDIUM STORING LOG INFORMATION MANAGEMENT PROGRAM THEREIN

(75) Inventor: Munemitsu Ikegami, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 401 days.

(21) Appl. No.: 11/113,995

(22) Filed: Apr. 26, 2005

(65) Prior Publication Data
US 2005/0256869 A1 Nov. 17, 2005

(30) Foreign Application Priority Data
May 13, 2004 (JP) ............................. 2004-144133

(51) Int. Cl.
G06F 17/30 (2006.01)
G06F 7/00 (2006.01)
(52) U.S. Cl. ......................................... 707/10; 707/102
(58) Field of Classification Search .................. 707/10, 707/102
See application file for complete search history.

(56) References Cited

U.S. PATENT DOCUMENTS

2004/0049531 A1* 3/2004 Honda et al. ................. 709/201

2006/0036721 A1* 2/2006 Zhao et al. ................... 709/223

FOREIGN PATENT DOCUMENTS

JP 2001-160030 6/2001

OTHER PUBLICATIONS

Oracle® Enterprise Manager Administrator's Guide, Release 9.2.0 Mar. 2002, Oracle® (Chapters 5-6).*

* cited by examiner

Primary Examiner—Kuen S Lu
(74) Attorney, Agent, or Firm—Dickstein Shapiro LLP (57) ABSTRACT

A log information management that includes a communication part configured to communicate with a log information generation device configured to generate log information about a job via a network, and a receiving part configured to receive the log information, to which job creation time information indicating a time when the job is created and log send time information indicating a time when the log information is sent are added, sent from the log information generation device based on a protocol using a tagged structured language via the communication part. The receiving part corrects the time when the job is created based on the difference between the time when the log information is sent, which is indicated by the log send time information added to the log information, and the time when the log information is received based on the protocol using the tagged structured language.

7 Claims, 6 Drawing Sheets

```
POST /jobLogService HTTP/1.1
Host: xxx.xxx.xxx.xxx
Content-type: soap/xml
Content-Length: nnn
SOAPAction: "urn:schemas-joblog:service#sendJobLogList"

<env:Envelope xmlns:env="http://www.w3.org/soap-envelope"
    env:encodingStyle="http://www.w3.org/soap-encoding"
    xmlns:enc="http://www.w3.org/soap-encoding">
  <env:Body>                                              ─411
    <m:sendJobLogList xmlns:m="urn:schemas-joblog:service">
      <jobLogList>
        <jobLog version="1.0">
          <generalInfo>
            <jobType>print</jobType>              ～4311
            <jobResult>complete</jobResult>       ～4312
            <userName>ike</userName>              ～4313
            <creationDate>20040209T131942+0900</creationDate>  ～4314
            <dispatchDate>20040209T131950+0900</dispatchDate>
          </generalInfo>                                       ～4315
          <hostInfo>
            <printerName>RRR</printerName>        ～4321
            <portName>xxx.xxx.xxx.xxx</portName>  ～4322
            <documentName>test.xls</documentName> ～4323
          </hostInfo>
          <jobPlotInfo>
            <documentPages>3</documentPages>      ～4331
            <copies>1</copies>                    ～4332
            <colorMode>monochrome</colorMode>     ～4333
            <mediaSize>a4</mediaSize>             ～4334
            <mediaType>plain</mediaType>          ～4335
            <duplex>simplex</duplex>              ～4336
            <numberUp>none</numberUp>             ～4337
          </jobPlotInfo>
          <pagePlotInfo>
            <totalPlanes>3</totalPlanes>          ～4341
          </pagePlotInfo>
        </jobLog>
      </jobLogList>
    </m:sendJobLogList>
  </env:Body>
</env:Envelope>
```

FIG.6

LOG INFORMATION MANAGEMENT DEVICE, LOG INFORMATION GENERATION DEVICE, AND COMPUTER-READABLE MEDIUM STORING LOG INFORMATION MANAGEMENT PROGRAM THEREIN

BACKGROUND OF THE INVENTION

1. Field of the Invention

The present invention relates to a log information management device, a log information generation device, and a computer-readable medium storing a log information management program therein, and more particularly relates to a log information generation device that generates log information, a log information management device that manages the log information sent from the log information generation device, and a computer-readable medium storing a log information management program therein.

2. Description of the Related Art

Network devices such as printers are generally managed with log information acquired from each device. The log information acquired from each device is often collected into a single server to be centrally managed therein. Such centralized management of log information from devices allows operators to easily know operation states of the devices (see, for example, Japanese Patent Laid-Open Publication No. 2001-160030).

However, some inexpensive devices do not have time recording functions and therefore cannot add time information to log information. Even if all the devices on a network have time recording functions, the time is not always synchronized among the devices. Therefore, when log information is collected from plural devices into a server, time relationships of events recorded in the log information of each of the devices cannot be correctly specified.

SUMMARY OF THE INVENTION

A general object of the present invention is to provide a log information management device, a computer-readable medium storing a log information management program recorded therein, and a log information generation device to solve the problem described above. A specific object of the present invention is to provide a log information management device capable of adding appropriate time information to log information collected from devices, a computer-readable medium storing a log information management program therein, and a log information generation device that sends log information to the log information management device.

According to an aspect of the present invention, there is provided a log information management device, comprising a communication part configured to communicate with a log information generation device configured to generate log information about a job via a network, and a receiving part configured to receive the log information, to which job creation time information indicating a time when the job is created and log send time information indicating a time when the log information is sent are added, sent from the log information generation device based on a protocol using a tagged structured language via the communication part, wherein the receiving part corrects the time when the job is created based on a difference between the time when the log information is sent, which is indicated by the log send time information added to the log information, and a time when the log information is received based on the protocol using the tagged structured language.

Since the log information management device corrects a creation time of each job based on a time when log information is received, the log information is managed with reference to a time in the log information management device.

According to another aspect of the present invention, there is provided a log information management device that comprises a communication part configured to communicate with a log information generation device configured to generate log information about a job via a network, and a receiving part configured to receive the log information sent from the log information generation device based on a protocol using a tagged structured language via the communication part, wherein if job creation time information indicating a time when the job is created is not added to the log information, the receiving part sets a time when the log information is received based on the protocol using the tagged structured language as the time when the job is created.

This log information management device can add time information to the log information if time information is not added thereto, and manage the log information with the time information.

According to still another aspect of the present invention, there is provided a log information generation device that comprises a communication part configured to communicate with a log information management device configured to manage log information about a job via a network, a log information generation part configured to generate the log information in a tagged structured language to which job creation time information indicating a time when the job is created and log send time information indicating a time when the log information is sent are added, and a sending part configured to send the log information generated by the log information generation part to the log information management device based on a protocol using the tagged structured language.

This log information generation device can add information on a time when the log is sent to the log information and send the log information to the log information management device. Therefore, the log information management device that receives the log information can correct the job creation time based on the log information receive time and the log information send time.

According to a further other aspect of the present invention, there is provided a computer-readable medium storing a log information management program that causes the above-described job information management device to execute their functions.

The present invention thus provides a log information management device capable of adding appropriate time information to log information collected from devices, a computer-readable medium storing a log information management program therein, and a log information management device that sends log information to the log information management device.

BRIEF DESCRIPTION OF THE DRAWINGS

FIG. 5 shows an example of a SOAP message containing log information; and

DETAILED DESCRIPTION OF THE PREFERRED EMBODIMENT

Figure 1:
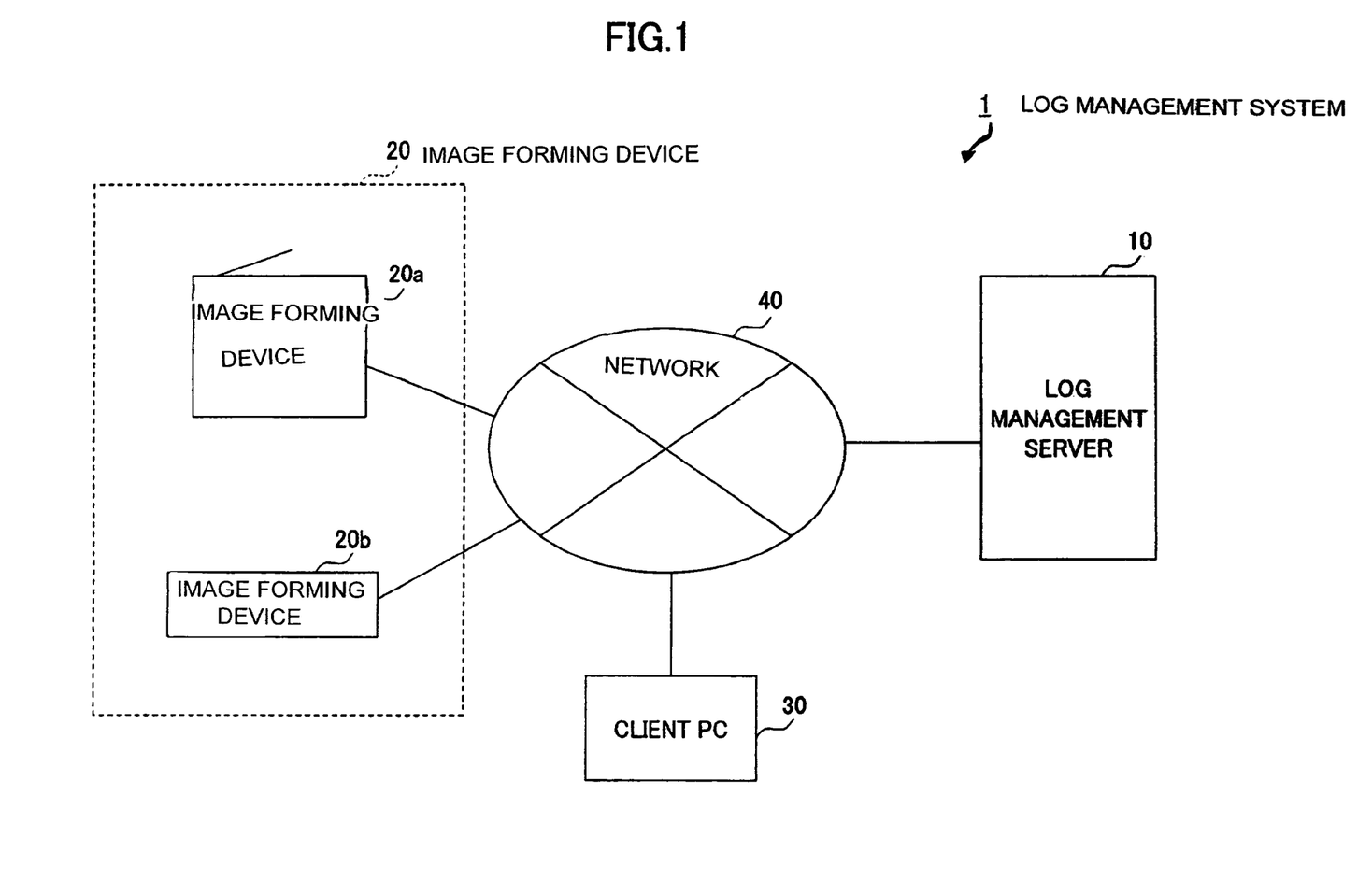
FIG. 1 shows a configuration diagram of a log management system according to an embodiment of the present invention.

The following description provides an exemplary embodiment of the present invention with reference to the accompanying drawings. FIG. 1 shows a configuration diagram of a log management system 1 according to an embodiment of the present invention. The log management system 1 shown in FIG. 1 comprises a log management server 10, an image forming device 20a, an image forming device 20b, and a client PC (Personal Computer) 30. The components 10 through 30 are connected to each other via a network 40 such as the Internet or a LAN (Local Area Network).

The image forming device is a so-called all-in-one unit or multifunction unit with multiple features such as printer, copier, and fax machine integrated in a single casing. The image forming device 20b is a printer such as a line printer. The image forming device 20a has a function for generating log information for print jobs or other jobs and a time recording function. The image forming device 20b also has a function for generating log information, but does not have a time recording function. That is, the image forming device 20a can add time information to log information, whereas the image forming device 20b cannot add time information to log information. These two image forming devices 20a and 20b are hereinafter collectively called as "image forming device 20" when they do not need to be differentiated.

The log management sever 10 is a computer having a function for managing the log information sent from the image forming device 20.

The client PC 30 is a computer used by end users. Users send print instructions or other instructions to the image forming device 20 from the client PC 30.

Figure 2:
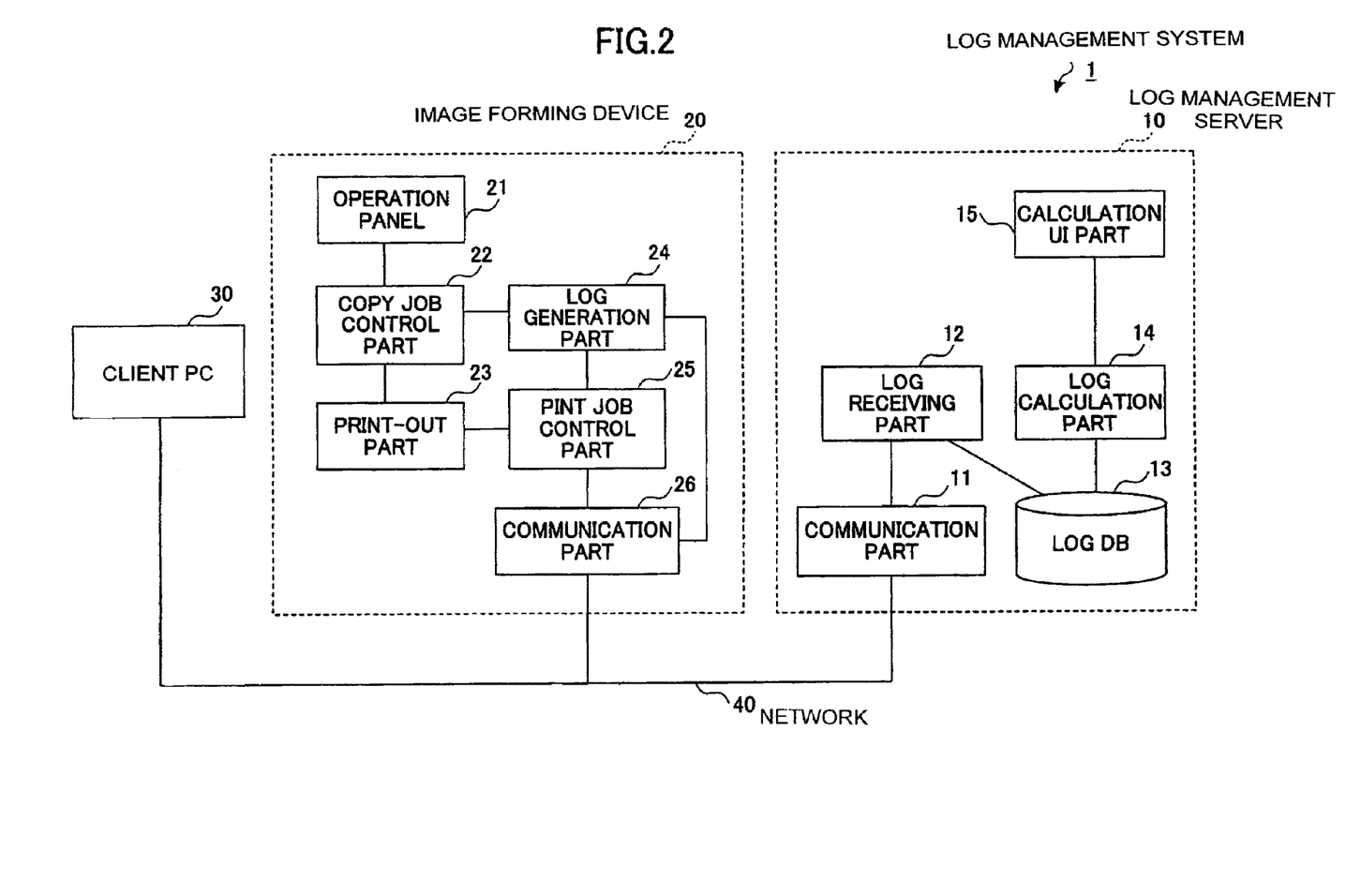
FIG. 2 shows a functional diagram of a log management system according to an embodiment of the present invention.

FIG. 2 shows a functional diagram of the log management system 1 according to this embodiment. As shown in FIG. 2, the log management server 10 comprises a communication part 11, a log receiving part 12, a log DB (database) 13, a log calculation part 14, and a calculation UI (User Interface) part 15.

The communication part 11 communicates with the image forming device 20 and the client PC 30 via the network 40. The communication part 11 of this embodiment establishes communication based on SOAP (Simple Object Access Protocol), which is a protocol using a tagged structured language. The tagged structured language employed in this embodiment is XML (eXtensible Markup Language).

The log receiving part 12 registers log information, which is sent from the image forming device 20 and received by the communication part 11, into the log DB 13. The log DB 13 is a database for accumulating log information sent from the image forming device 20. The calculation UI part 15 provides a user interface (screen) to allow users including operators to review the log information accumulated in the log DB 13. The log calculation part 14 provides the calculation UI part 15 with various calculation tools for the log information accumulated in the log DB 13.

The image forming device 20 comprises an operations panel 21, a copy job control part 22, a print-out part 23, a log generation part 24, a print job control part 25, and a communication part 26.

The operations panel 21 receives various job requests from users. The copy job control part 22 controls copy jobs. The print job control part 25 controls print jobs. The print-out part 23 prints information requested to be copied or printed on paper and outputs the paper. The log generation part 24 generates log information about copy jobs and print jobs. The communication part 26 communicates with the log management server 10 and the client PC 30. Communications between the communication part 26 and the log management server 10 are based on SOAP.

Figure 3:
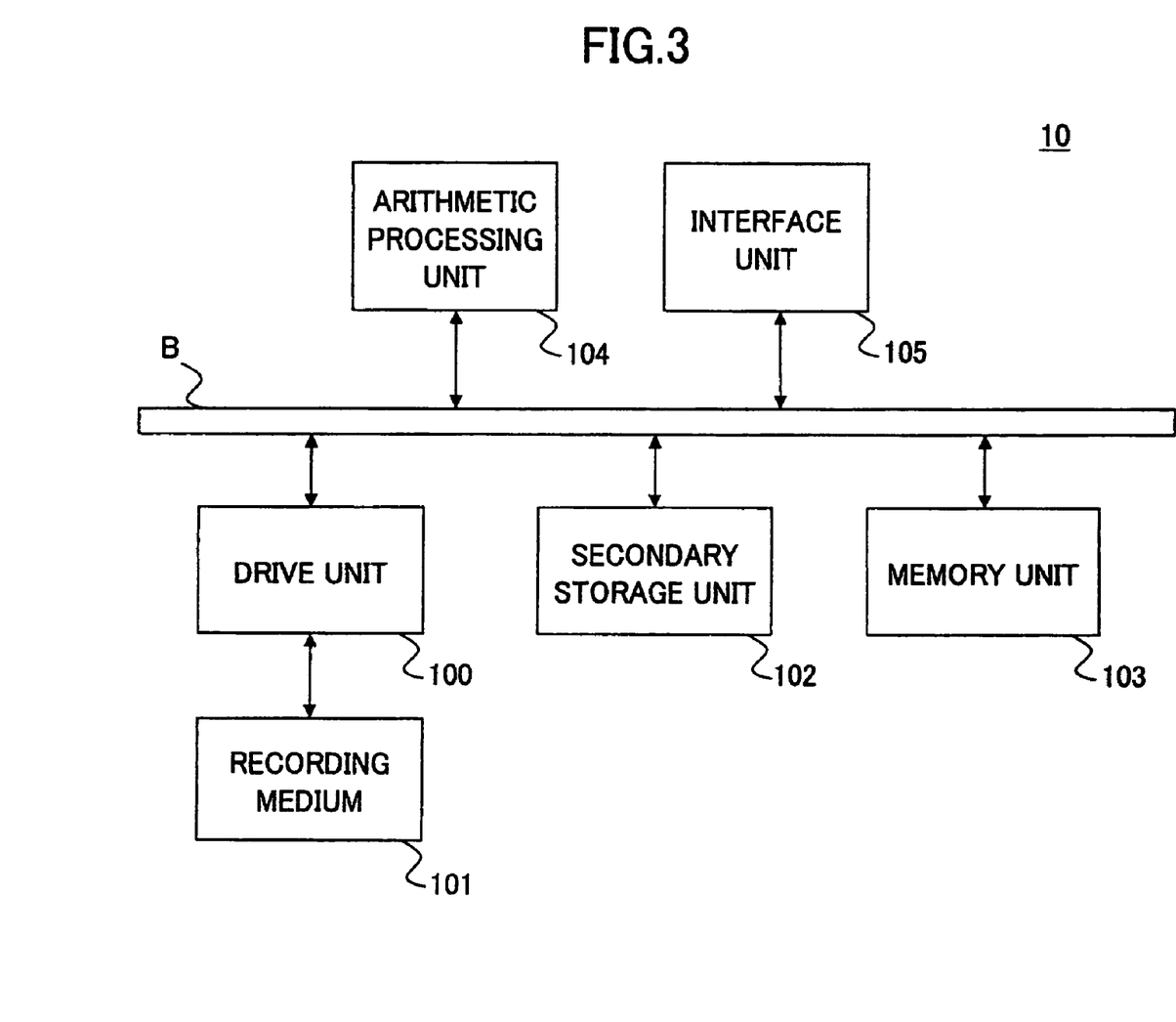
FIG. 3 shows a hardware configuration diagram of a log management server according to an embodiment of the present invention.

The following is a detailed description of the log management server 10. FIG. 3 shows a hardware configuration diagram of the log management server 10 according to this embodiment. The log management server 10 shown in FIG. 3 comprises a drive unit 100, a secondary storage unit 102, a memory unit 103, an arithmetic processing unit 104, and an interface unit 105, which are interconnected by a bus B.

A log management program that executes operations in the log management server 10 is provided from a recording medium 101 such as a CD-ROM. When the recording medium 101 having the log management program recorded thereon is loaded in the drive unit 100, the log management program is installed from the recording medium 101 into the secondary storage unit 102 through the drive unit 100.

The secondary storage unit 102 stores the installed log management program as well as necessary files and data therein. The memory unit 103, in response to a command for starting the log management program, reads out the log management program from the secondary storage unit 102 and holds the program therein. The arithmetic processing unit 104 executes a function in the log management server 10 according to the log management program held in the memory unit 103. The interface unit 105 is, for example, a modem or a router used for connecting the log management server 10 to the network 40 of FIG. 1.

Figure 4:
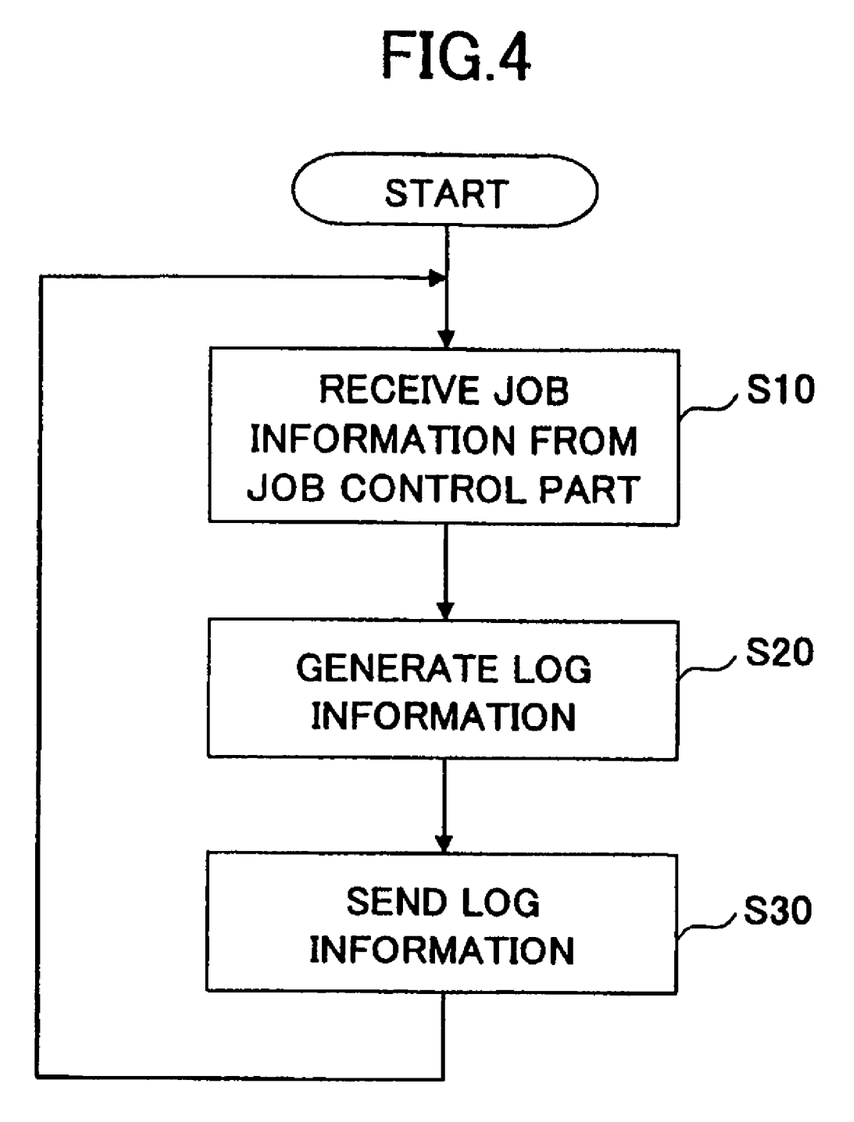
FIG. 4 is a flowchart illustrating operations in an image forming device.

Operations performed in the log management system 1 of FIG. 2 are described hereinafter. First, operations performed in the image forming device 20 are illustrated. FIG. 4 is a flowchart illustrating the operations in the image forming device 20. When an instruction to conduct a copy operation is issued by a user through the operations panel 21 or when an instruction to print document data is issued from the client PC 30, a copy job or a print job is created by the copy job control part 22 or the print job control part 25 based on these instructions. Then, the operations shown in FIG. 4 are performed.

The log generation part 24 receives job information of the copy job from the copy job control part 22 or job information of the print job from the pint job control part 25 in step S10. The operation then proceeds from step S10 through step S20, where the log generation part 24 generates log information in an XML format based on the job information. In this step, if the image forming device 20 has a time recording function (i.e. if the image forming device 20 is the image forming device 20a), the log generation part 24 adds job creation time (generation time), which indicates a time when the job is created, and a log send time, which indicates time when the log information is sent to the log management server 10, to the job information. If, on the other hand, the image forming device 20 does not have a time recording function (i.e. if the image forming device 20 is the image forming device 20b), the job creation time and the log send time are not added to the job information.

The operation then proceeds from step S20 to step S30, where the log generation part 24 invokes a log information sending method in the log receiving part 12 of the log management server 10 by using SOAP RPC and sends a SOAP message containing the log information to the log management sever 10 through the communication part 26. These operations from step S10 to step S30 are repeated every time a job is created.

FIG. 5 shows an example of the SOAP message containing log information. In a SOAP message 400 shown in FIG. 5, a Body element 410 enclosed by <Body> tags describes information for invoking the log information sending method. More specifically, the tag name "sendJobLogList" of a tag 411 shows the name of the log information sending method. A JobLogList element 420 enclosed by <jobLogList> tag describes a list of log information to be sent as an argument of the log information sending method.

The jobLogList element 420 may include one or more jobLog elements 430 (element enclosed by <jobLog> tag) as a subelement. In FIG. 5, the jobLogList element 420 includes one jobLog element 430. The jobLog element 430 describes log information for a single job, and includes a generalinfo element 431, a hostinfo element 432, a jobPlotInfo element 433, and a pagePlotInfo element 434 as subelements.

The generalinfo element 431 describes general information contained in the log information, and includes a jobType element 4311, a jobResult element 4312, a userName element 4313, a creationDate element 4314, and dispatchDate element 4315 as subelements. The jobType element 4311 describes a job type. The value "print" in FIG. 5 indicates a print job. The jobResult element 4312 shows a result of the job. The value "complete" in FIG. 5 indicates that the job is completed. The userName element 4313 shows the name of a user who issues the instructions of the job.

The creationDate element 4314 shows a time when the job is created in the image forming device 20. The dispatchDate element 4315 shows a time when the log information is sent by the image forming device 20. The value "20040209T131942+0900" of the creationDate element 4314 in FIG. 5 indicates Feb. 9, 2004, 13:19:42. Likewise, the value of the dispatchDate element 4315 indicates Feb. 9, 2004, 13:19:50. A part of the value including "+" and the following numbers indicates a difference from Universal Time. In the case where the image forming device 20 is not provided with the time recording function, the jobLog element 430 includes the creationDate element 4314 nor the dispatchDate element 4315, or includes the elements 4314 and 4315 with no values.

The hostInfo element 432 describes host information of the image forming device 20, and includes a printerName element 4321, a portName element 4322, and a documentName element 4323 as subelements. The printerName element 4321 shows the name of the image forming device 20. The portName element 4322 shows a port name. The documentName element 4323 shows the name of a document to be printed.

The jobPlotInfo element 433 describes print information of the job, and includes a documentPages element 4331, a copies element 4332, a colorMode element 4333, a mediaSize element 4334, a mediaType element 4335, a duplex element 4336, and a numberUp element 4337 as subelements. The documentpages element 4331 shows the number of pages of the document. The copies element 4332 shows the number of copies. The colorMode element 4333 shows whether it is monochrome printing or color printing. The mediaSize element 4334 shows a paper size. The mediaType element 4335 shows a paper type. The duplex element 4336 shows whether it is simplex printing or duplex printing. The numberUp element 4337 shows whether to print multiple original pages on each sheet.

The pagePlotInfo element 434 describes information on pages that are actually printed, and includes a totalPlanes element 4341 as a subelement. The totalPlanes element 4341 shows the number of original pages that are actually printed.

Figure 6:
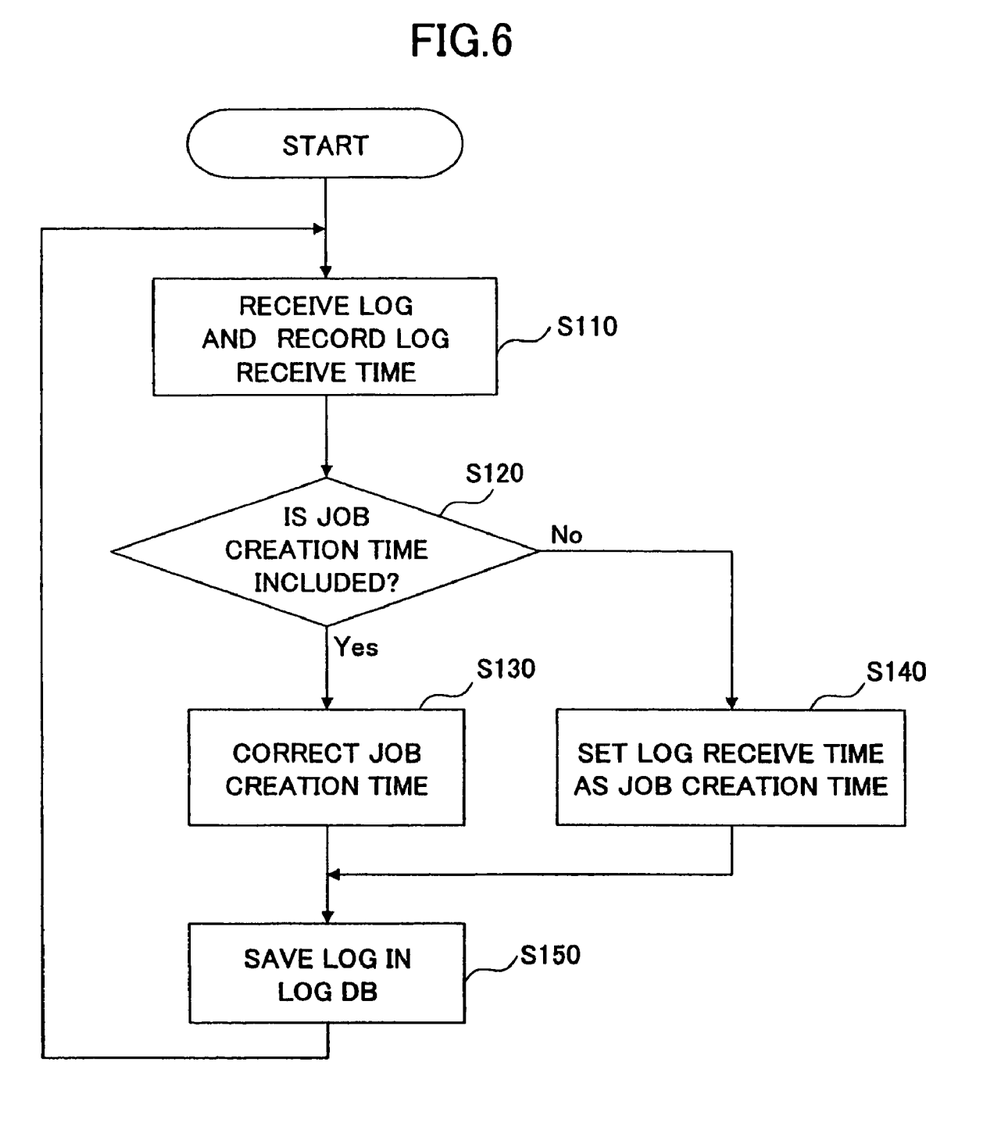
FIG. 6 is a flowchart illustrating operations in a log management server.

Next, operations performed by the log management server 10 are described. FIG. 6 is a flowchart illustrating operations in the log management server 10.

In step S110, the log receiving part 12 receives the SOAP message 400 containing the log information via the communication part 11, and records the time (hereinafter referred to as "log receive time") when the SOAP message 400 is received. The operation then proceeds from step S110 to step S120, where the log receiving part 12 refers to the log information in the SOAP message 400 to determine whether the job creation time (creationDate element 4314) is included.

If the log information includes the job creation time, the operation proceeds to step S130. In step S130, the log receiving part 12 calculates a difference between the log receive time and the log send time, and corrects the job creation time based on the difference. For example, the job creation time is corrected by adding the difference to the job creation time. If, on the other hand, the log information does not include the job creation time, the operation proceeds from step S120 to step S140. In step S140, the log receiving part 12 sets the log receive time as job creation time.

The operation then proceeds from step S130 or step S140 to S150, where the log receiving part 12 registers the log information containing corrected or newly set job creation time into the log DB 13. These operations from step S110 through step S150 are repeated every time the log management server 10 receives log information from the image forming device 20.

As described above, according to the log management system 1 of this embodiment, if the log information does not include the job creation time, the time when the log information is received is recorded as the job creation time in the log management server 10. If the log information includes the job creation time, the job creation time is corrected with reference to the time in the log management server 10. Therefore, even if the log management system 1 includes a device without a time recording function or if a time recording function of each of the devices is not accurately synchronized, the log information can be controlled with reference to the time in the log management server 10.

While the present invention has been described in terms of a preferred embodiment, it will be apparent to those skilled in the art that variations and modifications may be made without departing from the scope of the invention as set forth in the accompanying claims.

The present application is based on Japanese Priority Application No. 2004-144133 filed on May 13, 2004, with the Japanese Patent Office, the entire contents of which are hereby incorporated by reference.

What is claimed is

1. A log information management device, comprising: a communication part configured to communicate with a log information generation device configured to generate log information about a print or copy job via a network; and a receiving part configured to receive the log information, to which job creation time information and log send time information are added, wherein said job creation time indicates the time when the job is created, wherein said log send time information indicates a time when log information is sent, and wherein said log information is sent from the log information generation device based on a protocol using a tagged structured language via the communication part; wherein the receiving part corrects the time when the job is created based on a difference between the time when the log information is sent, which is indicated by the log send time information, and a time when the log information is received based on the protocol using the tagged structured language.

2. The log information management device as claimed in claim 1, wherein if the time when the job is created is added to the received log information, the receiving part corrects the time when the job is created.

3. A log information management device, comprising: a communication part configured to communicate with a log information generation device configured to generate log information about a print or copy job via a network; and a receiving part configured to receive the log information sent from the log information generation device based on a protocol using a tagged structured language via the communication part; wherein if job creation time information indicating a time when the job is created is not added to the log information, the receiving part sets a time when the log information is received based on the protocol using the tagged structured language as the time when the job is created.

4. A computer-readable medium storing a job information management program, the program causing a computer to execute: a log information receiving process of receiving log information about a print or copy job generated by and sent from a log information generation device, to which job creation time information and log send time information are added, based on a protocol using a tagged structured language via a communication part, wherein said job creation time indicates the time when the job is created, wherein said log send time information indicates the time when log information is sent; and a creation time correcting process of correcting the time when the job is created based on a difference between the time when the log information is sent, which is indicated by the log send time information added to the log information, and a time when the log information is received based on the protocol using the tagged structured language.

5. A computer-readable medium storing a job information management program, the program causing a computer to execute: a log information receiving process of receiving log information about a print or copy job generated by and sent from a log information generation device based on a protocol using a tagged structured language; and a creation time information setting process of setting a time when the log information is received based on the protocol using the tagged structured language as a time when the job is created, if job creation time information indicating the time when the job is created is not added to the log information.

6. A log management system, comprising:
  a plurality of networked log information generation devices, each device comprising:
    a communication part configured to communicate with a log information management device configured to manage log information about a print or copy job via a network;
    a log information generation part configured to generate the log information in a tagged structured language to which job creation time information and log send time information are added, wherein said job creation time indicates the time when the job is created, and wherein said log send time information indicates the time when log information is sent; and
    a sending part configured to send the log information generated by the log information generation part to the log information management device based on a protocol using the tagged structured language; and
  a log information management device comprising a receiving part configured to receive the log information from each of said plurality of log information generation devices and to automatically synchronize the job creation time information for each device according to the time in the log information management device.

7. The log management system according to claim 6, wherein each log information generating device further comprises a request receiving part configured to receive a request of the job.

* * * * *